(12) United States Patent
Love et al.

(10) Patent No.: US 8,047,094 B2
(45) Date of Patent: Nov. 1, 2011

(54) HYDRAULIC INVOLUTE CAM ACTUATOR

(75) Inventors: Lonnie J. Love, Knoxville, TN (US); Randall F. Lind, Loudon, TX (US)

(73) Assignee: UT-Battelle, LLC, Oak Ridge, TN (US)

( * ) Notice: Subject to any disclaimer, the term of this patent is extended or adjusted under 35 U.S.C. 154(b) by 492 days.

(21) Appl. No.: 12/394,276

(22) Filed: Feb. 27, 2009

(65) Prior Publication Data

US 2010/0218626 A1  Sep. 2, 2010

(51) Int. Cl.
*F16H 27/02* (2006.01)
(52) U.S. Cl. .................. 74/490.05; 623/59; 901/28
(58) Field of Classification Search ........... 74/490.01, 74/490.05, 490.06, 567, 569; 901/15, 22, 901/25, 28, 29; 623/24, 57–61
See application file for complete search history.

(56) References Cited

U.S. PATENT DOCUMENTS

| 2,010,377 | A | * | 8/1935 | Sassen | 91/180 |
| 4,628,765 | A | | 12/1986 | Dien et al. | |
| 4,966,067 | A | | 10/1990 | Ames et al. | |
| 5,107,719 | A | * | 4/1992 | Kota | 74/490.01 |
| 6,658,962 | B1 | * | 12/2003 | Rosheim | 74/490.05 |

FOREIGN PATENT DOCUMENTS

| GB | 1 217 134 | 12/1970 |
| GB | 1 374 997 | 11/1974 |

* cited by examiner

*Primary Examiner* — Raymond Addie
(74) *Attorney, Agent, or Firm* — Luedeka, Neely & Graham, P.C.

(57) ABSTRACT

Mechanical joints are provided in which the angle between a first coupled member and a second coupled member may be varied by mechanical actuators. In some embodiments the angle may be varied around a pivot axis in one plane and in some embodiments the angle may be varied around two pivot axes in two orthogonal planes. The joints typically utilize a cam assembly having two lobes with an involute surface. Actuators are configured to push against the lobes to vary the rotation angle between the first and second coupled member.

15 Claims, 10 Drawing Sheets

HYDRAULIC INVOLUTE CAM ACTUATOR

GOVERNMENT RIGHTS

This invention was made with government support under Contract No. DE-AC05-00OR22725 awarded by the U.S. Department of Energy. The government has certain rights in the invention.

FIELD

This disclosure relates to the field of mechanical joints having two coupled members. More particularly, this disclosure relates to mechanical joints that are actuated to change the orientation of the coupled members.

BACKGROUND

Various mechanisms are available to convert linear motion to rotational motion. Examples are ratchets, rack and pinion gears, and cranks. Almost all existing hydraulic manipulators use a slider crank mechanism to transform linear motion from a hydraulic actuator to rotary motion of a joint. There are two specific limitations to this approach. First, motion is generally limited to less than 120° of motion. Second, the transmission ratio (conversion of force to torque) is nonlinear and typically varies from about 2:1 to about 1:1 over the 120° workspace. The limitation of the transmission ratio requires that the actuators be oversized to give a specific torque requirement which adversely impacts the efficiency of a hydraulic system. Also, a slider-crank mechanism typically has a pivoting actuator to compensate for the circular motion of the crank center. Fluid powered actuators thus require some kind of flexible tubing or rotary union to pass fluids in and out of the actuator. These kinds of unions are much less reliable than a fixed porting and usually require considerable space. If, on the other hand, the actuator is not allowed to pivot, then an extra linkage is required to compensate for the circular crank motion. This additional linkage adds complexity and volume. What are needed therefore are more efficient and versatile mechanisms to convert linear motion to rotational motion.

SUMMARY

The present disclosure provides various embodiments of mechanical joints. Typically the mechanical joint has a first coupled member having a first pivot axis. There is a first cam assembly that is operatively secured to the first coupled member. The first cam assembly has a first lobe disposed on a first side of the first pivot axis and a second lobe disposed on a second side of the first pivot axis opposing the first side. The first lobe and the second lobe define a first curved surface having a first depression between the first lobe and the second lobe. Preferably the first curved surface is an involute surface. There is a second coupled member that is configured to rotate around the first pivot axis through a plurality of first axis angular positions. There is a first actuator that is operatively secured to the second coupled member and that is disposed on the first side of the first pivot axis and that has a first extendible rod with a first tip that is engaged with the first curved surface of the first lobe in a series of first contact points on the first curved surface. Each first contact point corresponds to one of the first axis angular positions and each has a first orthogonal distance (that may be a constant or fixed distance) from the first pivot axis. There is a second actuator that is operatively secured to the second coupled member and that is disposed on the second side of the first pivot axis and that has a second extendible rod with a second tip that is engaged with the first curved surface of the second lobe in a series of second contact points on the first curved surface. Each second contact point corresponds to one of the first axis angular positions and each has a second orthogonal distance (that may be a constant or fixed distance) from the first pivot axis. The first and second actuators are configured to rotate the second coupled member with respect to the first coupled member through the plurality of first axis angular positions.

A further embodiment provides a mechanical joint that has a first coupled member having a first pivot axis. There is a first cam assembly that is operatively secured to the first coupled member and that has a first lobe disposed on a first side of the first pivot axis and has a second lobe disposed on a second side of the first pivot axis opposing the first side. The first lobe and the second lobe define a first curved surface having a first depression between the first lobe and the second lobe. There is a second coupled member that is configured to rotate around the first pivot axis through a plurality of first axis angular positions. There is a first actuator that is operatively secured to the second coupled member and that is disposed on the first side of first pivot axis. The first actuator has a first extendible rod with a first tip that is engaged with the first curved surface of the first lobe in a series of first contact points on the first curved surface. Each first contact point corresponds to one of the first axis angular positions. The first actuator has a first thrusting mode and a first relaxing mode and a first thruster trace. There is a second actuator that is operatively secured to the second coupled member and that is disposed on the second side of the first pivot axis. The second actuator has a second extendible rod with a second tip that is engaged with the first curved surface of the second lobe in a series of second contact points on the first curved surface. Each second contact point corresponds to one of the first axis angular positions. The second actuator has a second thrusting mode and a second relaxing mode and a second thruster trace. In this embodiment, when the first actuator is in the first relaxing mode and the second actuator is in the second thrusting mode, the first tip translocates along the first thruster trace and along the first curved surface of the first lobe away from the first depression, and further, the second tip translocates along the second thruster trace and along the first curved surface of the second lobe toward the first depression, while during these translocations the second coupled member rotates around the first pivot axis in a first rotational direction. Furthermore in this embodiment, when the first actuator is in the first thrusting mode and the second actuator is in the second relaxing mode, the first tip translocates along the first thruster trace and along the first curved surface of the first lobe toward the first depression, and further, the second tip translocates along the second thruster trace and along the first curved surface of the second lobe away from the first depression, while during these translocations the second coupled member rotates around the first pivot axis in a second rotational direction that is opposed to the first rotational direction. Further in this embodiment, the first curved surface has a first tangent at each first contact point and has a second tangent at each second contact point and the first tangent at each first contact point is perpendicular to the first thruster trace and the second tangent at each second contact point is perpendicular to the second thruster trace.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred embodiments, reference is made to the accompanying drawings, which form a part hereof, and within which are shown by way of illustration the practice of specific embodiments of mechanical joints. It is to be understood that other embodiments may be utilized, and that structural changes may be made and processes may vary in other embodiments.

Figure 1A:
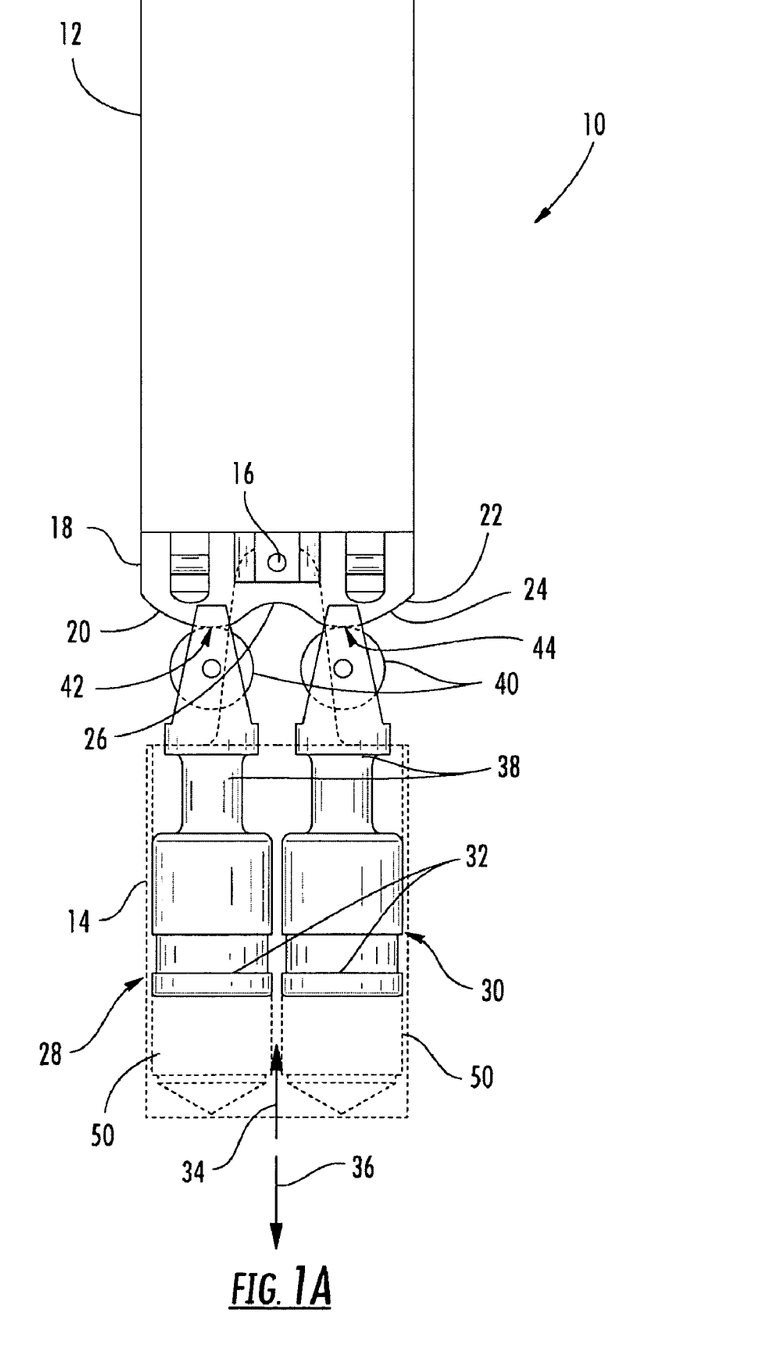
FIGS. 1A, 1B, and 1C are somewhat schematic cross sectional views of a mechanical joint providing angular movement around one pivot axis.
Figure 1B:
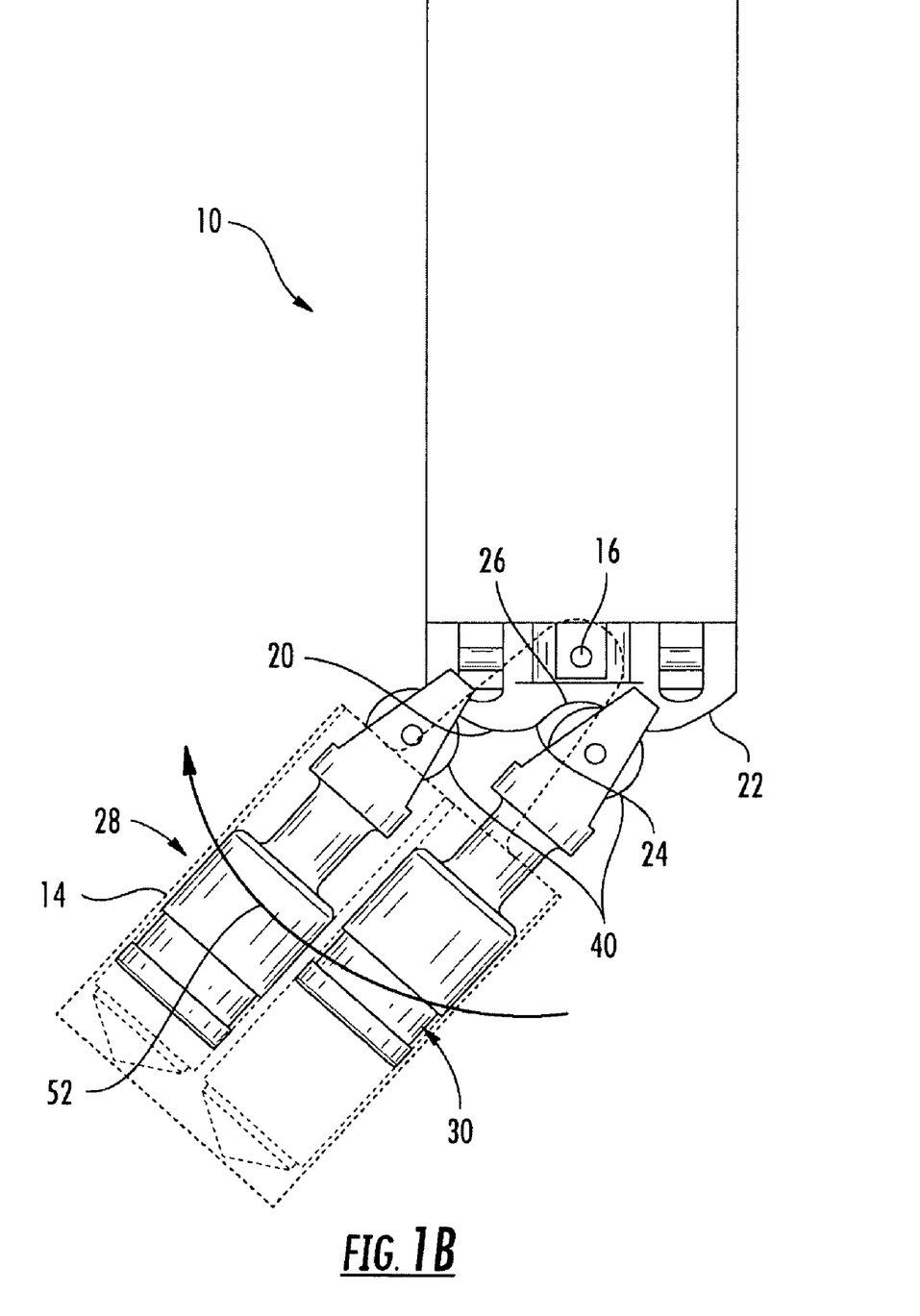
Figure 1C:
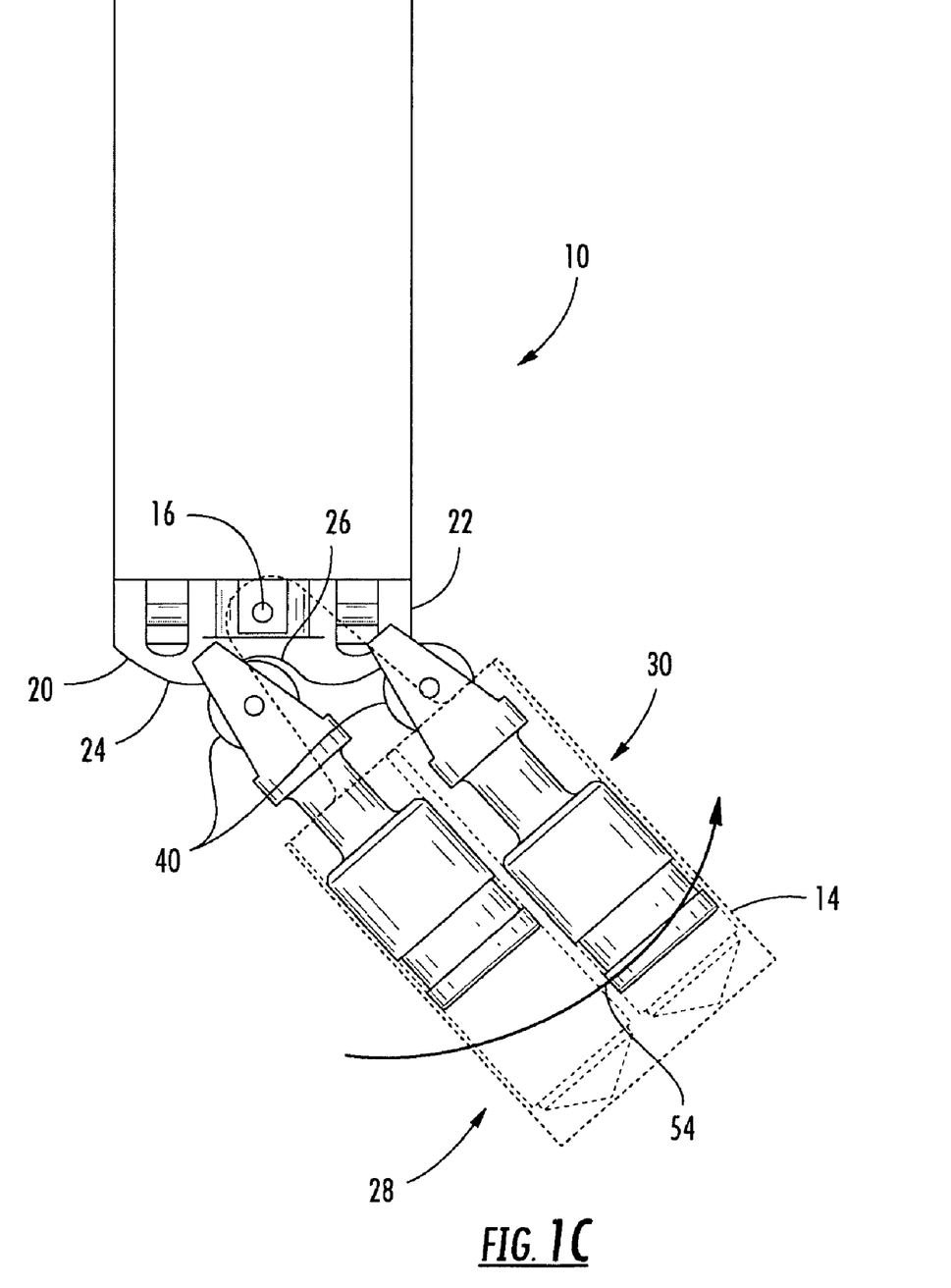

One embodiment of a mechanical joint 10 is illustrated in FIGS. 1A, 1B, and 1C. As seen in FIG. 1A, the mechanical joint 10 includes a first coupled member 12 and a second coupled member 14. The first coupled member 12 and the second coupled member 14 may be elements of a robotic arm, a prosthesis, or a similar structure where the joint 10 provides relative motion between the first coupled member 12 and the second coupled member 14. The second coupled member 14 is configured to rotate with respect to the first coupled member 12 around a first pivot axis 16. It is to be understood that the terms "rotate with respect to" and "relative motion" regarding two elements refers to circumstances where (a) the first element may remain stationary with respect to a coordinate system that is fixed in space and the second element may move with respect to that coordinate system, or (b) the second element may remain stationary with respect to that coordinate system and the first element may move with respect to that coordinate system, or (c) the first element and the second element may both move with respect to that coordinate system.

A first cam assembly 18 is operatively secured to the first coupled member 12. As used herein, the term "operatively secured" refers to an arrangement of the recited elements that establishes a structural connection between the recited elements, either by direct attachment of the elements together or by connection of the recited elements through one or more intervening elements. Elements that are operatively secured may move with respect to each other unless they are also described as rigidly secured to each other. The first cam assembly 18 includes a first lobe 20 and a second lobe 22 that define a first curved surface 24 with a first depression 26 between the first lobe 20 and the second lobe 22. The first lobe 20 is disposed on one side of the first pivot axis 16 and the second lobe 22 is disposed on a second (opposing) side of the first pivot axis 16.

Operatively secured to the second coupled member 14 is a first actuator 28 and a second actuator 30. The first actuator 28 and the second actuator 30 each include pistons 32 that are each configured to move in a thrusting direction 34 and a relaxing direction 36. The first actuator 28 and the second actuator 30 each have a rod 38 and each rod 38 has a roller 40. The rollers 40 are examples of "tips" of the actuators. In some embodiments a tip may be a pointed portion of a rod (38), but a roller (e.g., 40) is generally the preferred form of a tip for an actuator because a roller generally results in less friction with the curved surface (e.g., 24) of a cam assembly (e.g., 18). The roller 40 on the first actuator 28 engages the first curved surface 24 of the first lobe 20 of the first cam assembly 18 at a first contact point 42, and the roller 40 on the second actuator 30 engages the first curved surface 24 of the second lobe 22 of the first cam assembly 18 at a second contact point 44. The first contact point 42 and the second contact point 44 are relocated on the first curved surface 24 through a series of first contact points 42 and second contact points 44 as the first coupled member 12 and the second coupled member 14 rotate with respect to each other around the first pivot axis 16.

The first actuator 28 and the second actuator 30 each have a "thrusting mode" and a "relaxing mode." The thrusting mode is a configuration where force is applied to the rod (e.g., rod 38) of the actuator in thrusting direction 34. The relaxing mode is a configuration where the rod (e.g., rod 38) is not impeded from motion in either the thrusting direction 34 or the relaxing direction 36. For example, typically the actuators are activated by hydraulic pressure, and as illustrated in FIG. 1A, when an actuator is configured in the thrusting mode, pressurized hydraulic fluid is applied in a chamber 50 behind the corresponding piston 32. When an actuator is configured to be in the relaxing mode, hydraulic fluid is allowed to flow at least unimpeded (and optionally assisted by suction) out of the chamber 50. Similar principles apply if the actuators are powered by pneumatics, solenoids or other power sources.

Typically, when the first actuator 28 is configured to be in the thrusting mode, the rod (e.g., 38) of the first actuator moves in the thrusting direction 34 while at the same time the second actuator 30 is configured to be in the relaxing mode and the rod (e.g., 38) of the second actuator 30 moves in the relaxing direction 36. Typically, when the second actuator 28 is configured to be in the thrusting mode, the rod (e.g., 38) of the second actuator 30 moves in the thrusting direction while at the same time the first actuator is configured to be in the relaxing mode and the rod (e.g., 38) of the first actuator 28 moves in the relaxing direction 36.

FIG. 1B depicts a configuration of the mechanical joint 10 where the first actuator 28 has been placed in the relaxing mode and the second actuator 30 has been placed in the thrusting mode. In this configuration a first tip (i.e., the roller 40 of the first actuator 28) translocates along the first curved surface 24 of the first lobe 20 away from the first depression 26 and a second tip (i.e., the roller 40 of the second actuator 30) translocates along the first curved surface 24 of the second lobe 22 toward the first depression 26 as the second coupled member 14 rotates with respect to the first coupled member 12 around the first pivot axis 16 in a first rotational direction 52.

FIG. 1C depicts a configuration of the mechanical joint 10 where the first actuator 28 has been placed in the thrusting mode and the second actuator 30 has been placed in the relaxing mode. In this configuration the first tip (i.e., the roller 40 of the first actuator 28) translocates along the first curved surface 24 of the first lobe 20 toward the first depression 26 and the second tip (i.e., the roller 40 of the second actuator 30) translocates along the first curved surface 24 of the second lobe 22 away from the first depression 26 as the second coupled member 14 rotates with respect to the first coupled member 12 around the first pivot axis 16 in a second rotational direction 54 that is opposed to the first rotational direction 52.

Figure 2A:
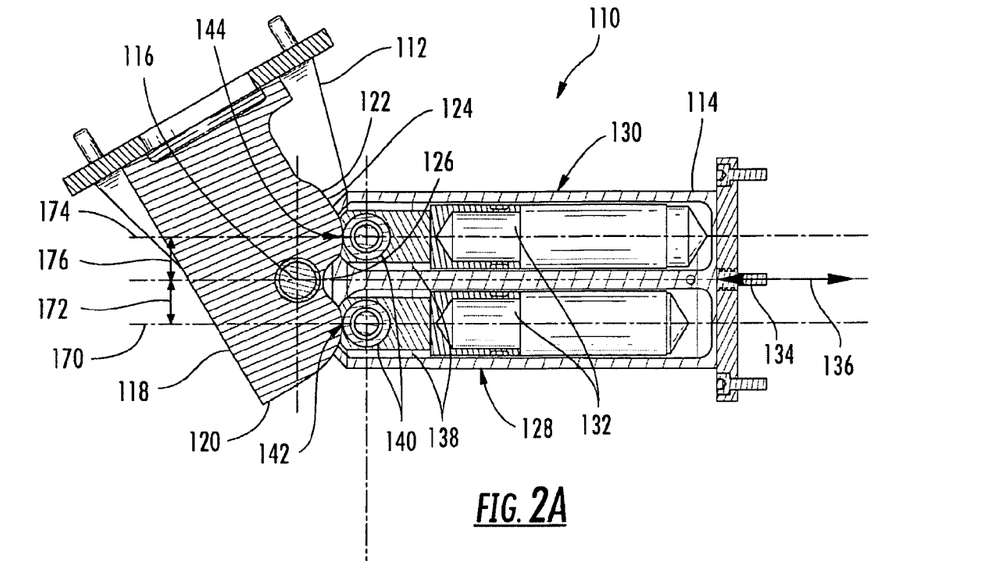
FIGS. 2A and 2B are somewhat schematic cross sectional views of a mechanical joint providing angular movement around one pivot axis.
Figure 2B:
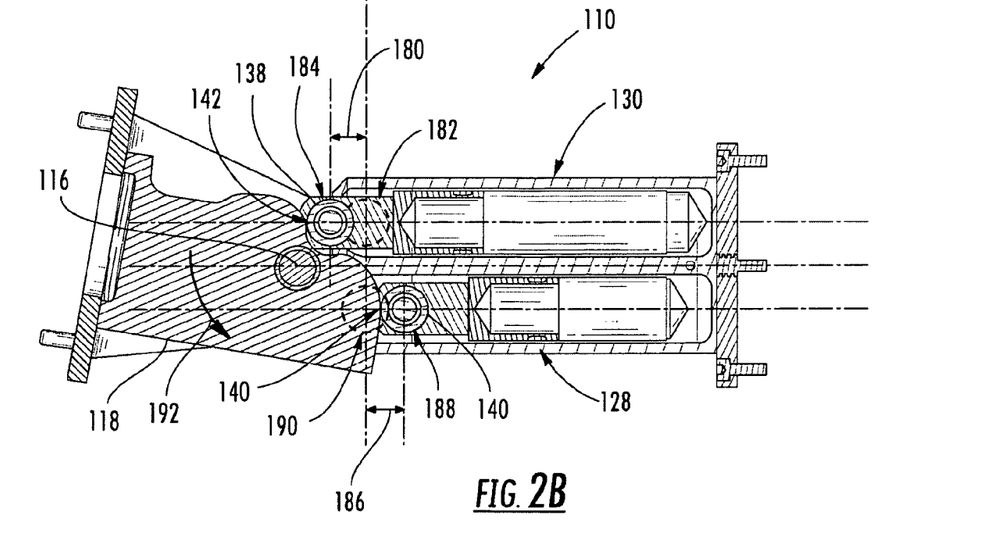

A further embodiment of a mechanical joint 110 is illustrated in FIGS. 2A and 2B. As seen in FIG. 2A, the mechanical joint 110 includes a first coupled member 112 and a second coupled member 114. The second coupled member 114 is configured to rotate with respect to the first coupled member 112 around a first pivot axis 116. A cam assembly 118 is operatively secured to the first coupled member 112. The cam assembly 118 includes a first lobe 120 and a second lobe 122 that define a curved surface 124 with a depression 126 between the first lobe 120 and the second lobe 122. The first lobe 120 is disposed on one side of the first pivot axis 116 and the second lobe 122 is disposed on a second (opposing) side of the first pivot axis 116.

Operatively secured to the second coupled member 114 is a first actuator 128 and a second actuator 130. The first actuator 128 and the second actuator 130 each include pistons 132 that are each configured to move in a thrusting direction 134 and a relaxing direction 136. The first actuator 128 and the second actuator 130 each have a rod 138 and each rod 138 has a roller 140. The roller 140 on the first actuator 128 engages the curved surface 124 of the first lobe 120 of the cam assembly 118 at a first contact point 142, and the roller 140 on the second actuator 130 engages the curved surface 124 of the second lobe 122 of the cam assembly 118 at a second contact point 144. The first contact point 142 and the second contact point 144 are relocated on the first curved surface 124 as the first coupled member 112 and the second coupled member 114 rotate with respect to each other around the first pivot axis 116.

As the first actuator 128 reconfigures between (a) a thrusting mode and (b) a relaxing mode, the first actuator 128 moves in the thrusting direction 134 and in the relaxing direction 136 (respectively) along a first thruster trace 170. At its point of closest proximity to the first pivot axis 116 the first thruster trace 170 is a first orthogonal distance 172 from the first pivot axis 116. As the second actuator 130 reconfigures between (a) a thrusting mode and (b) a relaxing mode, the second actuator 130 moves in the thrusting direction 134 and the relaxing direction 136 (respectively) along a second thruster trace 174. At its point of closest proximity to the first pivot axis 116 the second thruster trace 174 is a second orthogonal distance 176 from the first pivot axis 116. Typically the first orthogonal distance 172 and the second orthogonal distance 176 are configured to be substantially equal distances, and the symbol "r" is used herein to refer to that distance. When different or potentially different orthogonal distances (e.g., 172 and 176) are referred to herein they are designated as "$r_i$," "$r_j$," etc.

FIG. 2B illustrates a configuration of the mechanical joint 110 where (as compared with FIG. 2A) the second actuator 130 has been configured in a thrusting mode and the first actuator 128 has been configured in a relaxing mode. As a result of these configuration changes, the roller 140 of the second actuator 130 has moved along second thruster trace 174 a second relocation distance 180, from a position 182 to a position 184. The roller 140 of the first actuator 128 has moved along the first thruster trace 172 a first relocation distance 186 from a position 188 to a position 190. As a consequence of these movements of these rollers 140 the first coupled member 118 has rotated around the first pivot axis 116 through an angle 192.

Several benefits are achieved from the configuration of FIGS. 2A and 2B. First, the curved surface 124 is configured such that there is a first tangent to the curved surface 124 at each first contact point 142 with the roller 140 of the first actuator 128, and a second tangent at each second contact point 144 of the roller 140 of the second actuator 130, and the first tangent at each first contact point 142 is perpendicular to the first thruster trace 170 and the second tangent at each second contact point 144 is perpendicular to the second thruster trace 174. These perpendicular positions keep the side loads on the actuators 128 and 130 very low, and reduces friction between the rollers 140 and the curved surface 124.

Second, because the orthogonal distances 172 and 176 are constant through the range of motion of the actuators 128 and 130, the torque applied to the first coupled member 118 by the actuators 128 and 130 is linearly proportional to the difference between the forces applied by their respective pistons 132. For example, if the piston 132 of the second actuator 130 applies F1 lbs. of force and the piston 132 of the first actuator 128 applies F2 lbs. of force, and the first orthogonal distance 172 and the second orthogonal distance 176 are both a constant or fixed "r" ft., then the torque applied to the first coupled member 118 is given by Equation 1.

$$\text{Torque} = r*(F1-F2) \text{ ft.-lbs.} \quad \text{(Eq'n 1)}$$

The relationship of Equation 1 leads to a related benefit. Namely, the torque applied to a joint may be measured simply by putting strain gages on each of the actuators, and converting strain to stress force, and then (by knowing "r,") the torque can be calculated.

A third benefit of the configuration of FIGS. 2A and 2B is that, because of the shape of the curved surface 124 (and because the first orthogonal distance 172 is substantially equal to the second orthogonal distance 176), as the first coupled member 118 rotates around the first pivot axis 116, the first relocation distance 186 in this embodiment is always substantially equal to the second relocation distance 180. Then if the pistons 132 are the same size, a hydraulic system may be configured to simultaneously extract the same amount of hydraulic fluid from one actuator as is being injected into the other actuator. Furthermore, if in this configuration the hydraulic lines between the first and second actuators (128 and 130) are interconnected so that the pressure is substantially equalized on both pistons 132, the net torque is zero and the first coupled member 118 rotates substantially freely (with only friction-like forces affecting the movement).

A fourth benefit of the configuration is that the actuators do not need to pivot. This eliminates the need for potentially unreliable flexible tubing or rotary unions to carry fluid to the cylinder and reduces space requirements.

A fifth benefit of the configuration is that, because the design makes use of a pair of antagonistic actuators, any mechanical backlash in the system is automatically removed. Typical slider-cranks are push-pull arrangements where clearances in the connecting link pins or pivots introduce backlash or free play. Even a small amount of backlash is very detrimental to precise positioning and smooth control.

In the embodiment of FIGS. 2A and 2B, where the first orthogonal distance 172 and the second orthogonal distance 176 are a constant or fixed value "r," the curved surface is configured to conform at least in part to a loci of $(x_i, y_i)$ points that vary through a varying rotational angle "θ" (i.e., different $θ_i$'s) and are defined by Equation 2 and Equation 3.

$$x_i = r*(\cos(θ_i) + θ_i*\sin(θ_i)) \quad \text{(Eq'n 2)}$$

$$y_i = r*(\sin(θ_i) - θ_i*\cos(θ_i)) \quad \text{(Eq'n 3)}$$

When different or potentially different loci of points and or rotational angles are referred to herein they are designated as $x_i$, $y_i$, $x_j$, $y_j$ etc. and $θ_i$, $θ_j$, etc.

Table 1 provides exemplary values for a loci of points calculated according to Equation 1 and Equation 2.

TABLE 1

| $\Theta_i$ - degrees | $\Theta_i$ - radians | $x_i/r$ | $y_i/r$ |
|---|---|---|---|
| 135 | 2.35619449 | 0.958974 | 2.373188 |
| 120 | 2.094395102 | 1.313799 | 1.913223 |
| 105 | 1.832595715 | 1.511332 | 1.440236 |
| 90 | 1.570796327 | 1.570796 | 1 |
| 75 | 1.308996939 | 1.523213 | 0.627132 |
| 60 | 1.047197551 | 1.4069 | 0.342427 |
| 45 | 0.785398163 | 1.262467 | 0.151746 |
| 30 | 0.523598776 | 1.127825 | 0.04655 |
| 15 | 0.261799388 | 1.033684 | 0.00594 |
| 0 | 0 | 1 | 0 |
| −15 | −0.261799388 | 1.033684 | −0.00594 |
| −30 | −0.523598776 | 1.127825 | −0.04655 |
| −45 | −0.785398163 | 1.262467 | −0.15175 |
| −60 | −1.047197551 | 1.4069 | −0.34243 |
| −75 | −1.308996939 | 1.523213 | −0.62713 |
| −90 | −1.570796327 | 1.570796 | −1 |
| −105 | −1.832595715 | 1.511332 | −1.44024 |
| −120 | −2.094395102 | 1.313799 | −1.91322 |
| −135 | −2.35619449 | 0.958974 | −2.37319 |

Figure 3:
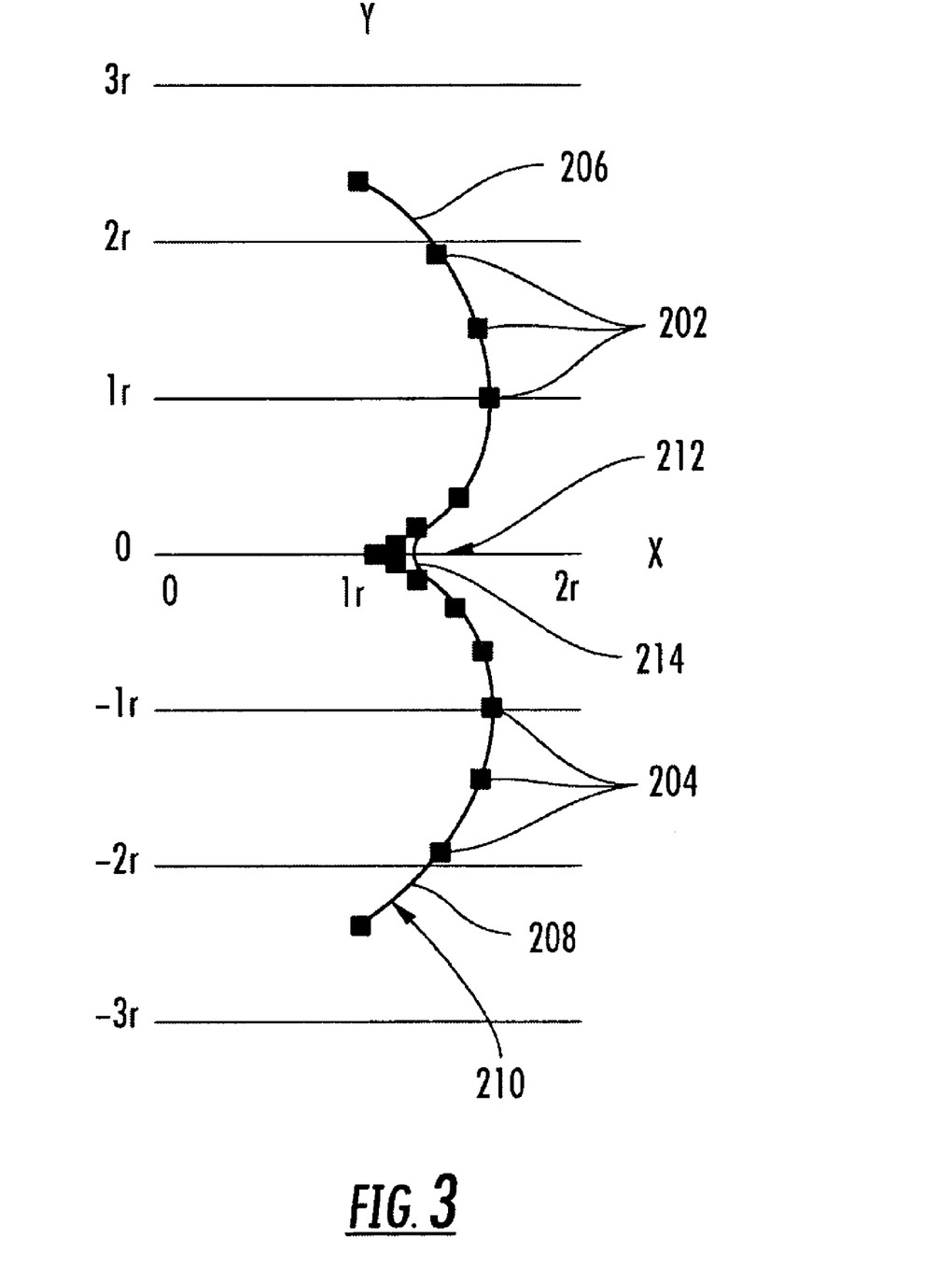
FIG. 3 depicts a curved surface and a loci of points that define the curved surface.

FIG. 3 illustrates a plot of a first loci 202 and a second loci 204 of values taken from Table 1. The first loci 202 define a first lobe 206 and the second loci 204 define a second lobe 208 of a cam assembly for a mechanical joint. The first lobe 206 and the second lobe 208 define a curved surface 210 with a depression 212 between the first lobe 206 and the second lobe 208. Equations 2 and 3 are derived for configurations where the tips of the actuators are zero-dimension points. To accommodate tips that have a non-zero-dimension feature (such as the rollers 140 of FIGS. 2A and 2B) a fairing surface 214 may be provided in the area of y=0. A configuration that has a curved surface like curved surface 210 that combines loci of points (e.g., 202 and 204) from Equations 2 and 3 with a fairing surface (e.g. 214) is referred to herein as a curved surface that conforms at least in part to a loci of (x,y) points given by Equations 2 and 3.

Figure 4A:
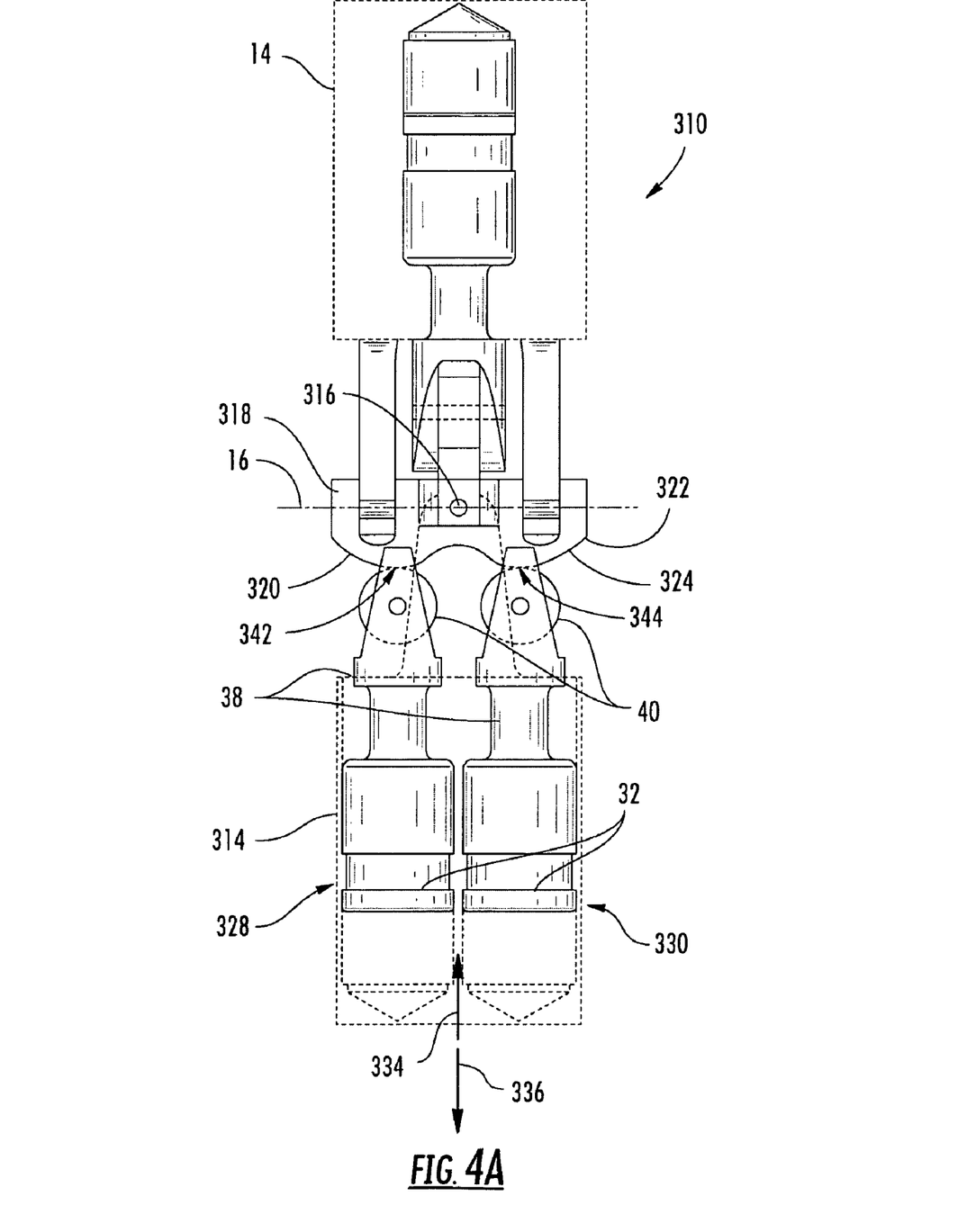
FIGS. 4A, 4B, 4C, and 5 are somewhat schematic cross sectional views of a mechanical joint providing angular movement around two pivot axes.
Figure 4B:
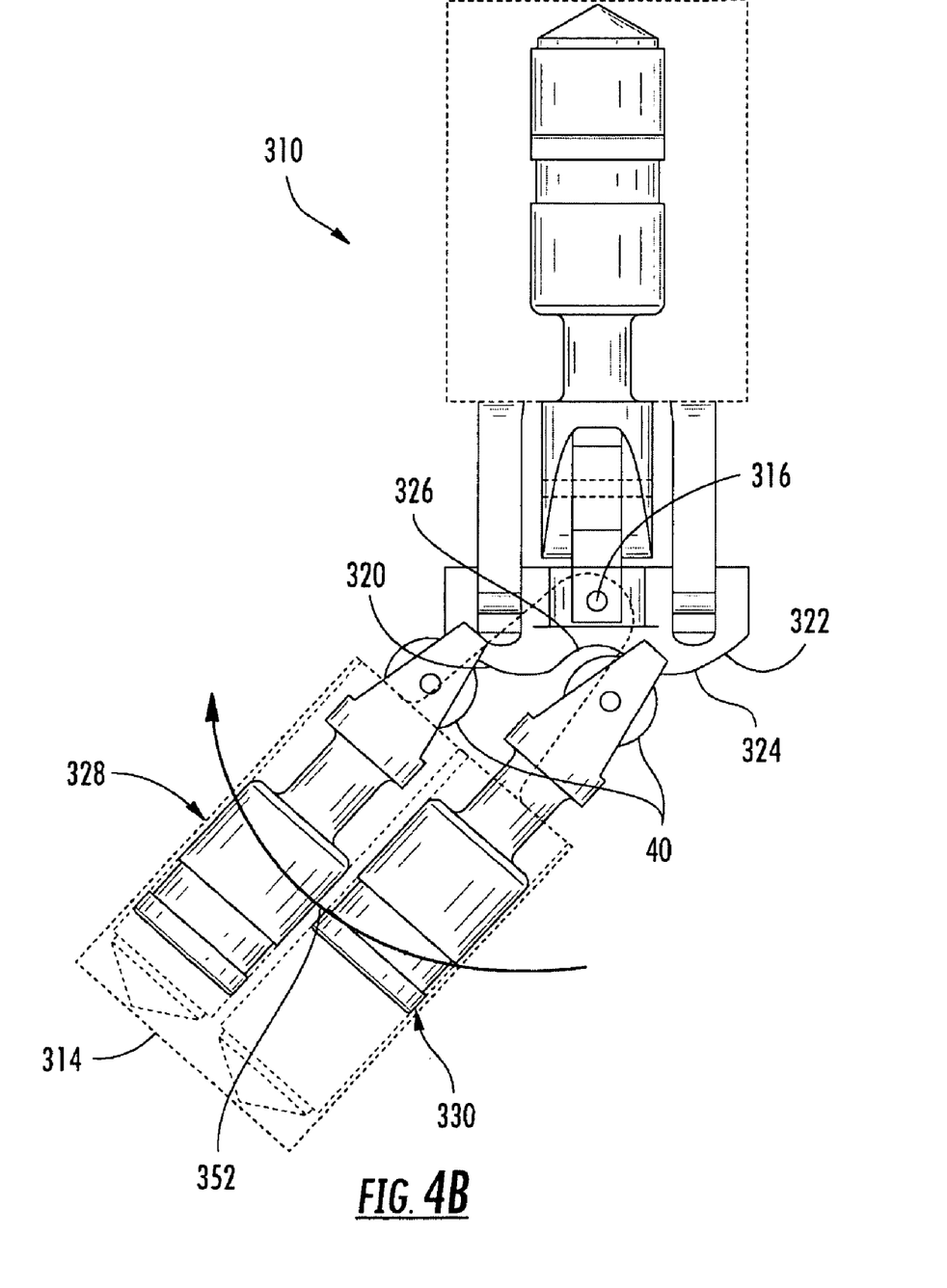
Figure 4C:
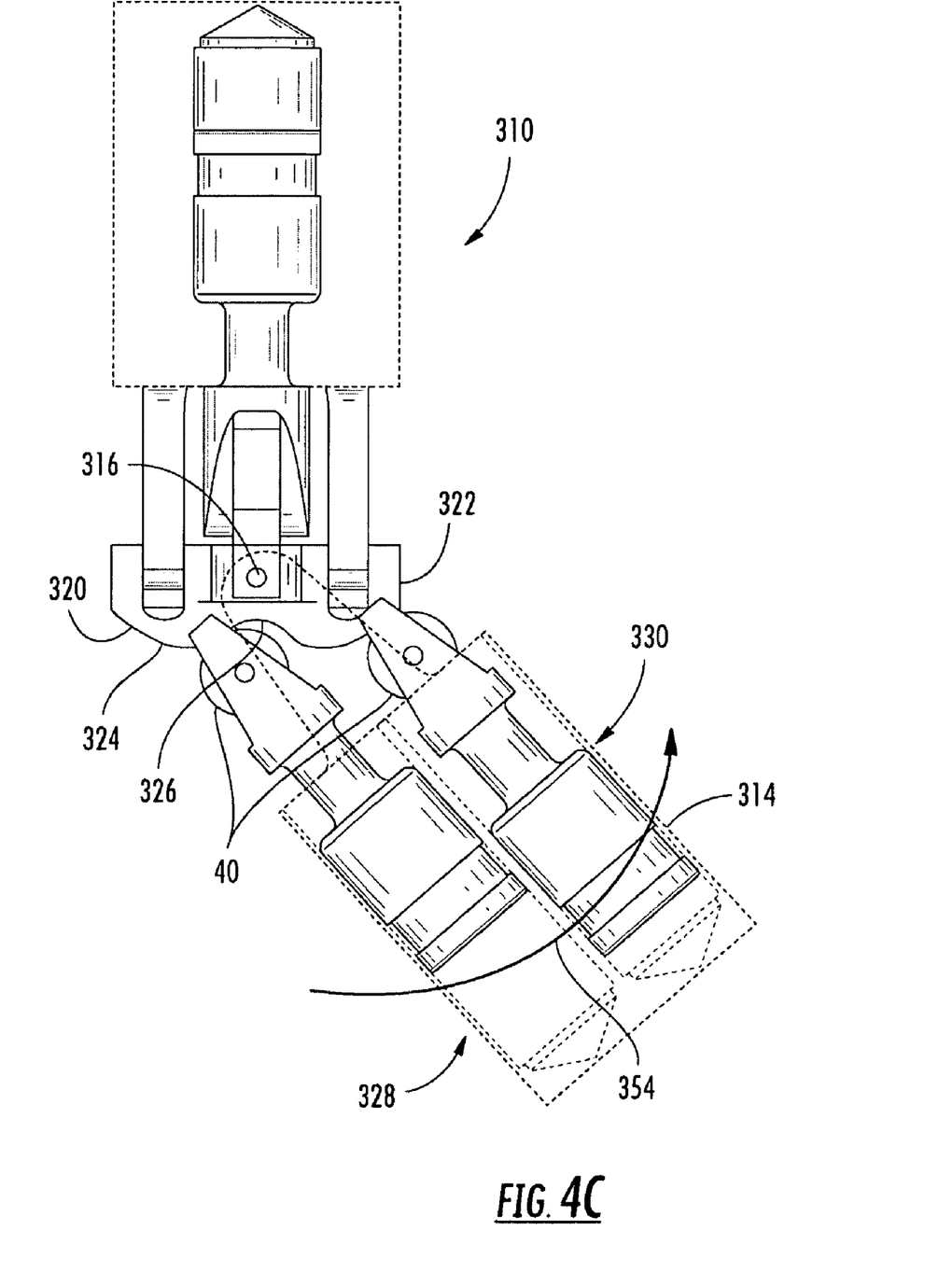

FIGS. 4A, 4B, and 4C illustrate a mechanical joint 310 providing angular movement around two pivot axes. These axes may intersect or they may have an offset. As seen in FIG. 4A, the mechanical joint 310 includes the second coupled member 14 of FIGS. 1A, 1B, and 1C. The second coupled member 14 (in terms of how it is illustrated in FIG. 4A) has been turned upside down and rotated 90 degrees about an axis parallel with the thrusting direction and relaxing direction depicted in FIG. 1A. In the mechanical joint 310 the second coupled member 14 replaces the first coupled member 12 of the mechanical joint 10 of FIG. 1A. The mechanical joint 310 incorporates a third coupled member 314 that is configured to rotate with respect to the second coupled member 14 around a second pivot axis 316 that is orthogonal to the first pivot axis 16.

A second cam assembly 318 is operatively secured to the second coupled member 14. The second cam assembly 318 includes the first cam assembly 18 of FIG. 1, plus a third lobe 320 and a fourth lobe 322 that define a second curved surface 324 having a depression 326 between the third lobe 320 and the second lobe 324. The third lobe 320 is disposed on one side of the second pivot axis 316 and the fourth lobe 322 is disposed on a second (opposing) side of the second pivot axis 316.

Operatively secured to the third coupled member 314 is a third actuator 328 and a fourth actuator 330. The third actuator 328 and the fourth actuator 330 each include pistons 32 that are each configured to move in a thrusting direction 334 and a relaxing direction 336. The third actuator 328 and the fourth actuator 330 each have a rod 38 and each rod 38 has a roller 40. The roller 40 on the third actuator 328 engages the second curved surface 324 of the third lobe 320 of the second cam assembly 18 at a first contact point 342, and the roller 40 on the fourth actuator 330 engages the second curved surface 324 of the fourth lobe 322 of the second cam assembly 18 at a second contact point 344. The first contact point 342 and the second contact point 344 are relocated on the first curved surface 324 as the second coupled member 14 and the third coupled member 314 rotate with respect to each other around the second pivot axis 316.

The third actuator 328 and the fourth actuator 330 each have a thrusting mode and a relaxing mode. The thrusting mode is a configuration where force is applied to the rod (e.g., rod 38) of the actuator in thrusting direction 334. The relaxing mode is a configuration where the rod (e.g., rod 38) is not impeded from motion in either the thrusting direction 334 or the relaxing direction 336.

FIG. 4B depicts a configuration of the mechanical joint 310 where the third actuator 328 has been placed in the relaxing mode and the fourth actuator 330 has been placed in the thrusting mode. In this configuration a first tip (i.e., the roller 40 of the third actuator 328) translocates along the second curved surface 324 of the third lobe 320 away from the depression 326 and a second tip (i.e., the roller 40 of the fourth actuator 330) translocates along the second curved surface 324 of the fourth lobe 322 toward the depression 326 as the third coupled member 314 rotates around the second pivot axis 316 in a third rotational direction 352.

FIG. 4C depicts a configuration of the mechanical joint 310 where the third actuator 328 has been placed in the thrusting mode and the fourth actuator 330 has been placed in the relaxing mode. In this configuration the first tip (i.e., the roller 40 of the first actuator 328) translocates along the second curved surface 324 of the third lobe 320 toward the depression 326 and the second tip (i.e., the roller 40 of the fourth actuator 330) translocates along the second curved surface 324 of the fourth lobe 322 away from the depression 326 as the third coupled member 314 rotates around the second pivot axis 316 in a fourth rotational direction 354 that is opposed to the third rotational direction 352.

Figure 5:
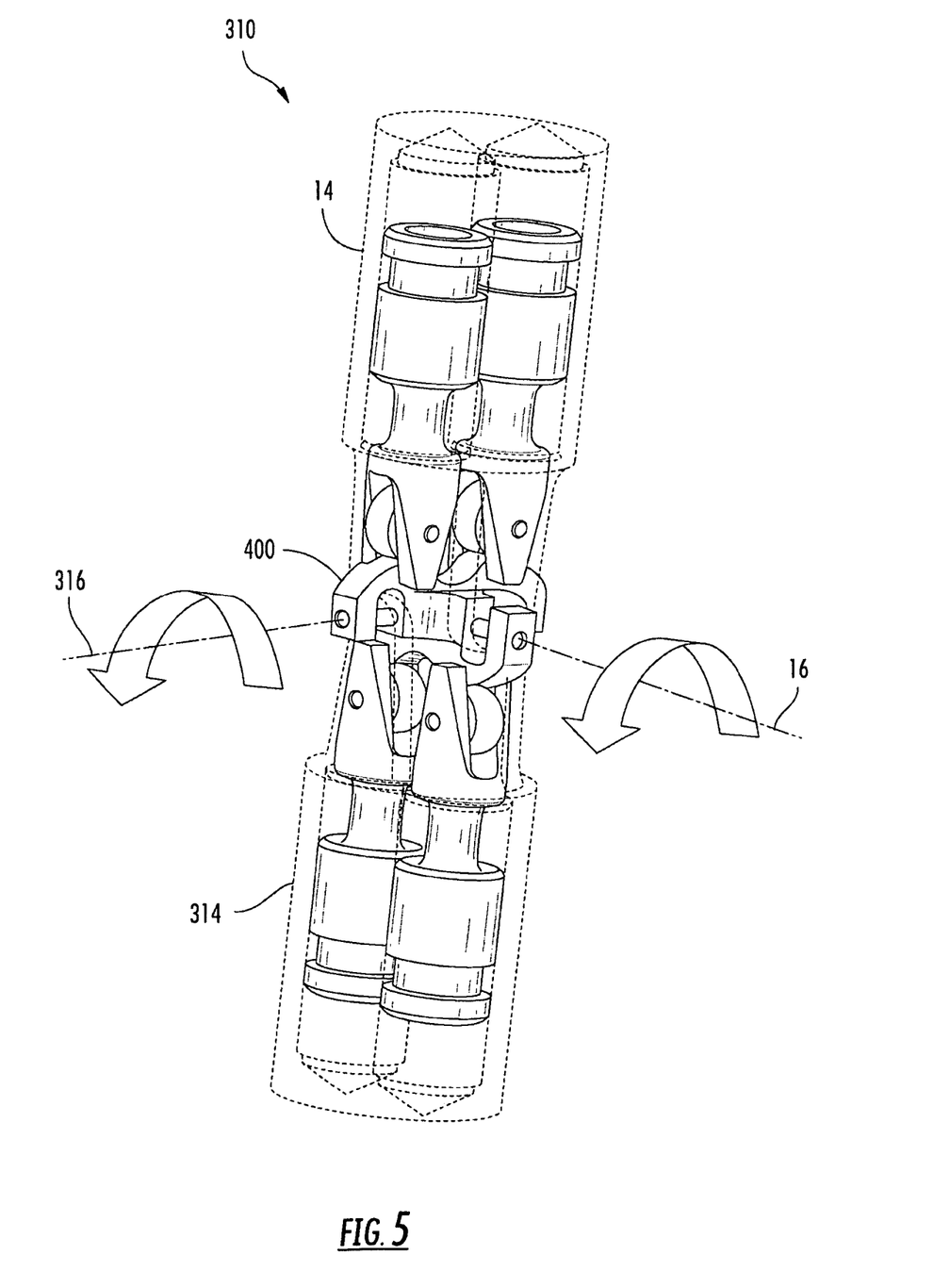

FIG. 5 depicts a perspective view of the mechanical joint 310 of FIG. 4A. FIG. 5 illustrates second coupled member 14, third coupled member 314, the first pivot axis 16 and the second pivot axis 316. FIG. 5 also illustrates how the first cam assembly 18 of FIGS. 1A, 1B, and 1C and the second cam assembly 318 of FIGS. 4A, 4B, and 4C may be combined to form a "spider" 400. The first pivot axis 16 and second pivot axis 316 may intersect or may have an offset.

Figure 6:
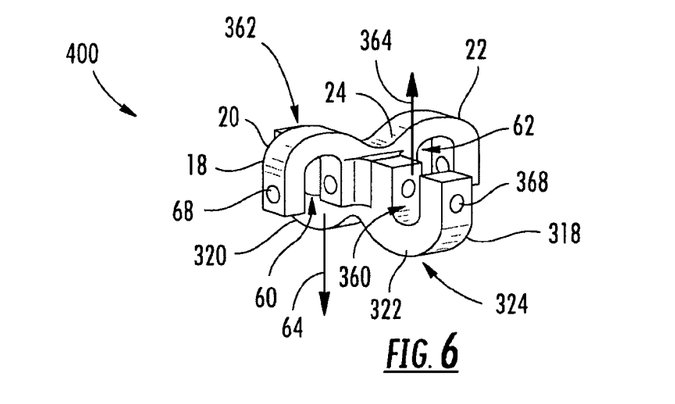
FIG. 6 is a somewhat schematic perspective view of two cam assemblies.

FIG. 6 depicts a perspective view of the spider 400. The first cam assembly 18 and the second cam assembly 318 are each characterized as a "dual arch-shaped member." As used herein, the term "arch-shaped" refers to a member having a concave arch-shaped surface inside a convex arch-shaped surface, and the term "dual arch-shaped member" refers to a configuration of two arch-shaped members disposed side by side in substantially the same geometric plane. As seen in FIG. 6, a convex arch-shaped surface of a dual arched-shaped member forms the curved surface 24 of the first lobe 20 and the second lobe 22 of the first dual arch-shaped member (first cam assembly 18). A convex arch-shaped surface of a dual arch-shaped member forms the curved surface 324 of the third lobe 320 and the fourth lobe 322 of the second arch-shaped member (second cam assembly 318). A concave arch-shaped portion of the first dual arched member (first cam assembly 18) provides a first opening 60 and a second opening 62 having a first open direction 64. A concave arch-shaped portion of the second dual arched member (second cam assembly 318) provides a first opening 360 and a second opening 362 having a second open direction 364 that is opposed to the first open direction 64. As seen in FIG. 6, the first dual arch-surfaced member (first cam assembly 18) and the second dual arch-shaped member (second cam assembly 318) are joined orthogonally at their midpoints in a configuration wherein the first open direction (64) is opposed to the second open direction 364.

Figure 7:
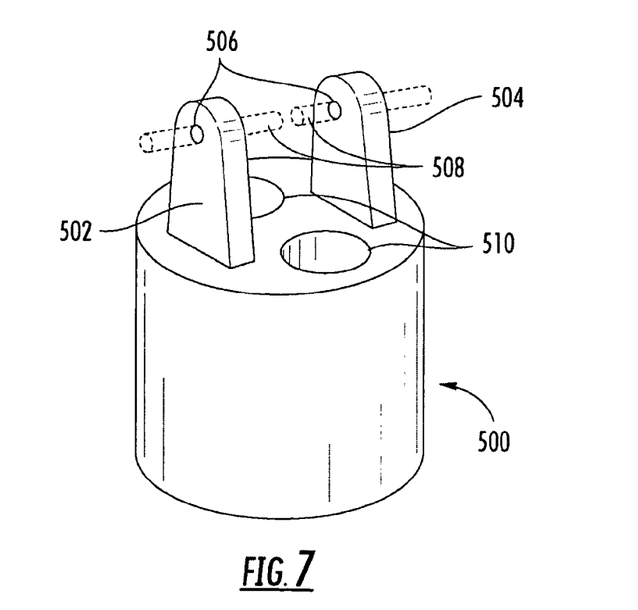
FIG. 7 is a somewhat schematic perspective view of a coupling.

FIG. 7 depicts a coupling 500 that may be used in a coupled member of a mechanical joint (such as mechanical joint 310 of FIGS. 4A, 4B, and 4C). The coupling 500 includes two tabs 502 and 504, each of which has a first mounting hole 506. The first tab 504 is configured for insertion in the first opening 60 of the first cam assembly 18 of FIG. 6, and the second tab 506 is configured for insertion in the second opening 62 of the first cam assembly 18. The first mounting holes 506 are configured to align with corresponding first mounting holes 68 of the first cam assembly 18, wherein the coupling 500 and the spider 400 may be operatively secured to each other using pins 508 (depicted in FIG. 7). The pins 508 establish the first pivot axis 16 depicted in FIGS. 4A and 5. The second cam assembly 318 of FIG. 6 also provides second mounting holes 368 for joining a second coupling 500 (inverted from the orientation of that element that is depicted in FIG. 7) to the spider 400 of FIG. 6 using further pins 508. The further pins 508 establish the second pivot axis 316 depicted in FIGS. 4A and 5.

Figure 8:
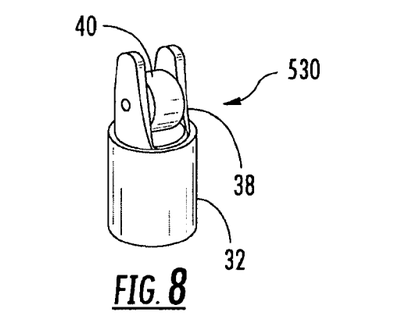
FIG. 8 is a somewhat schematic perspective view of an actuator.

The coupling 500 of FIG. 7 further includes hollow cylinders 510 each of which is configured for insertion of an actuator 530 of FIG. 8. The actuator 530 of FIG. 8 is an example of a device that may be used as the actuators 28, 30, 128, 130, 328, and 330 described previously herein. The actuator 530 includes a piston 32, a rod 38, and a roller 42.

In summary, embodiments disclosed herein describe various features of mechanical joints. The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A mechanical joint comprising:
  a first coupled member having a first pivot axis;
  a first cam assembly operatively secured to the first coupled member and having a first lobe disposed on a first side of the first pivot axis and a second lobe disposed on a second side of the first pivot axis opposing the first side, the first lobe and the second lobe defining a first curved surface having a first depression between the first lobe and the second lobe;
  a second coupled member configured to rotate around the first pivot axis through a plurality of first axis angular positions;
  a first actuator operatively secured to the second coupled member and disposed on the first side of first pivot axis and having a first extendible rod with a first tip that is engaged with the first curved surface of the first lobe in a series of first contact points on the first curved surface, each first contact point corresponding to one of the first axis angular positions and each having a first orthogonal distance from the first pivot axis; and
  a second actuator operatively secured to the second coupled member and disposed on the second side of the first pivot axis and having a second extendible rod with a second tip that is engaged with the first curved surface of the second lobe in a series of second contact points on the first curved surface, each second contact point corresponding to one of the first axis angular positions and each having a second orthogonal distance from the first pivot axis; wherein
  the first actuator and the second actuator are configured to cause rotation of the second coupled member with respect to the first coupled member through the plurality of first axis angular positions.

2. The mechanical joint of claim 1 wherein the first orthogonal distance and the second orthogonal distance each are a value "$r_1$" and the first curved surface conforms at least in part to a loci of $(x_i, y_i)$ points that vary through a varying rotational angle "$\theta_i$" and are defined by: $x_i = r_1*(\cos(\theta_i) + \theta_i*\sin(\theta_i))$, $y_i = r_1*(\sin(\theta_i) - \theta_i*\cos(\theta_i))$.

3. The mechanical joint of claim 1 wherein:
  the first actuator has a first thrusting mode and a first relaxing mode and a first thruster trace;
  the second actuator has a second thrusting mode and a second relaxing mode and a second thruster trace; and
  when the first actuator is in the first relaxing mode and the second actuator is in the second thrusting mode, the first tip translocates along the first thruster trace and along the first curved surface of the first lobe away from the first depression and the second tip translocates along the second thruster trace and along the first curved surface of the second lobe toward the first depression as the second coupled member rotates around the first pivot axis in a first rotational direction; and
  when the first actuator is in the first thrusting mode and the second actuator is in the second relaxing mode, the first tip translocates along the first thruster trace and along the first curved surface of the first lobe toward the first depression and the second tip translocates along the second thruster trace and along the first curved surface of the second lobe away from the first depression as the second coupled member rotates around the first pivot axis in a second rotational direction that is opposed to the first rotational direction; wherein
  the first curved surface has a first tangent at each first contact point and has a second tangent at each second contact point, and at each first contact point the first tangent is perpendicular to the first thruster trace, and at each second contact point the second tangent is perpendicular to the second thruster trace.

4. The mechanical joint of claim 1 wherein:
  the second coupled member has a second pivot axis that is orthogonal to the first pivot axis; and
  the first coupled member is configured to rotate around the second pivot axis through a plurality of second axis angular positions; and
  the mechanical joint further comprises:
  a second cam assembly operatively secured to the second coupled member and having a third lobe disposed on a first side of the second pivot axis and a fourth lobe disposed on a second side of the second pivot axis opposing the first side, the third lobe and the fourth lobe defining a second curved surface having a second depression;

a third actuator operatively secured to the first coupled member and disposed on the first side of second pivot axis and having a third extendible rod with a third tip that is engaged with the second curved surface of the third lobe in a series of third contact points on the second curved surface, each third contact point corresponding to one of the second axis angular positions and each having a third orthogonal distance from the second pivot axis; and a fourth actuator operatively secured to the first coupled member and disposed on the second side of the second pivot axis and having a fourth extendible rod with a fourth tip that is engaged with the second curved surface of the fourth lobe in a series of fourth contact points on the second curved surface, each fourth contact point corresponding to one of the second axis angular positions and each having a fourth orthogonal distance from the second pivot axis; wherein the third actuator and the fourth actuator are configured to cause rotation of the second coupled member with respect to the first coupled member through the plurality of second pivot axis angular positions.

5. The mechanical joint of claim 4 wherein the third orthogonal distance and the fourth orthogonal distance each are a value "$r_2$" and the second curved surface conforms at least in part to a loci of $(x_j, y_j)$ points that vary through a varying rotational angle "$\theta_j$" and are defined by: $x_j = r_2*(\cos(\theta_j) + \theta_j * \sin(\theta_j))$, $y_j = r_2*(\sin(\theta_j) - \theta_j * \cos(\theta_j))$.

6. The mechanical joint of claim 4 wherein:
the third actuator has a third thrusting mode and a third relaxing mode and a third thrusting trace;
the fourth actuator has a fourth thrusting mode and a fourth relaxing mode and a fourth thrusting trace; and
when the third actuator is in the third relaxing mode and the fourth actuator is in the fourth thrusting mode, the third tip translocates along the third thrusting trace and along the second curved surface of the third lobe away from the second depression and the fourth tip translocates along the fourth thrusting trace and along the second curved surface of the fourth lobe toward the second depression as the first coupled member rotates around the second pivot axis in a third rotational direction that is orthogonal to the first and second rotational directions; and
when the third actuator is in the third thrusting mode and the fourth actuator is in the fourth relaxing mode, the third tip translocates along the third thrusting trace and along the second curved surface of the third lobe toward the second depression and the fourth tip translocates along the fourth thrusting trace and along the second curved surface of the fourth lobe away from the second depression as the first coupled member rotates around the second pivot axis in a fourth rotational direction that is opposed to the first rotational direction and that is orthogonal to the first and second rotational directions; wherein
the second curved surface has a third tangent at each third contact point and has a fourth tangent at each fourth contact point and at each third contact point the third tangent is perpendicular to the third thruster trace and at each fourth contact point the fourth tangent is perpendicular to the fourth thruster trace.

7. The mechanical joint of claim 4 wherein the first cam assembly comprises a first dual arch-member having a first open direction and the second cam assembly comprises a second dual arch-shaped member having a second open direction and wherein the first dual arch-shaped member and the second dual arch-shaped member are joined orthogonally at their midpoints in a configuration wherein the first open direction is opposed to the second open direction.

8. A mechanical joint comprising:
a first coupled member having a first pivot axis;
a first cam assembly operatively secured to the first coupled member and having a first lobe disposed on a first side of the first pivot axis and a second lobe disposed on a second side of the first pivot axis opposing the first side, the first lobe and the second lobe defining a first curved surface having a first depression between the first lobe and the second lobe;
a second coupled member configured to rotate around the first pivot axis through a plurality of first axis angular positions;
a first actuator operatively secured to the second coupled member and disposed on the first side of the first pivot axis and having a first extendible rod with a first tip that is engaged with the first curved surface of the first lobe in a series of first contact points on the first curved surface, each first contact point corresponding to one of the first axis angular positions, and the first actuator having a first thrusting mode and a first relaxing mode and a first thruster trace;
a second actuator operatively secured to the second coupled member and disposed on the second side of the first pivot axis and having a second extendible rod with a second tip that is engaged with the first curved surface of the second lobe in a series of second contact points on the first curved surface, each second contact point corresponding to one of the first axis angular positions, and the second actuator having a second thrusting mode and a second relaxing mode and a second thruster trace; wherein
when the first actuator is in the first relaxing mode and the second actuator is in the second thrusting mode, the first tip translocates along the first thruster trace and along the first curved surface of the first lobe away from the first depression and the second tip translocates along the second thruster trace and along the first curved surface of the second lobe toward the first depression as the second coupled member rotates around the first pivot axis in a first rotational direction; and
when the first actuator is in the first thrusting mode and the second actuator is in the second relaxing mode, the first tip translocates along the first thruster trace and along the first curved surface of the first lobe toward the first depression and the second tip translocates along the second thruster trace and along the first curved surface of the second lobe away from the first depression as the second coupled member rotates around the first pivot axis in a second rotational direction that is opposed to the first rotational direction; and wherein
the first curved surface has a first tangent at each first contact point and has a second tangent at each second contact point and the first tangent at each first contact point is perpendicular to the first thruster trace and the second tangent at each second contact point is perpendicular to the second thruster trace.

9. The mechanical joint of claim 8 wherein each first contact point has first orthogonal distance from the first pivot axis and each second contact point has a second orthogonal distance from the first pivot axis and the first orthogonal distance and the second orthogonal distance each are a value "$r_1$" and the first curved surface conforms at least in part to a loci of $(x_i, y_i)$ points that vary through a varying rotational angle "$\theta_i$" and are defined by: $x_i = r_1*(\cos(\theta_i) + \theta_i * \sin(\theta_i))$, and $y_i = r_1*(\sin(\theta_i) - \theta_i * \cos(\theta_i))$.

10. The mechanical joint of claim 8 wherein the second coupled member has a second pivot axis that is orthogonal to the first pivot axis and the first coupled member is configured to rotate around the second pivot axis through a plurality of second axis angular positions, and the mechanical joint further comprises:
- a second cam assembly operatively secured to the second coupled member and having a third lobe disposed on a first side of the second pivot axis and a fourth lobe disposed on a second side of the second pivot axis opposing the first side, the third lobe and the fourth lobe defining a second curved surface having a second depression;
- a third actuator operatively secured to the first coupled member and disposed on the first side of second pivot axis and having a third extendible rod with a third tip that is engaged with the second curved surface of the third lobe in a series of third contact points on the second curved surface, each third contact point corresponding to one of the second axis angular positions, and the third actuator having a third thrusting mode and a third relaxing mode and a third thruster trace; and
- a fourth actuator operatively secured to the first coupled member and disposed on the second side of the second pivot axis and having a fourth extendible rod with a fourth tip that is engaged with the second curved surface of the fourth lobe in a series of fourth contact points on the second curved surface, each fourth contact point corresponding to one of the second axis angular positions, and the fourth actuator having a fourth thrusting mode and a fourth relaxing mode and a fourth thruster trace; wherein
- when the third actuator is in the third relaxing mode and the fourth actuator is in the fourth thrusting mode, the third tip translocates along the third thruster trace and along the second curved surface of the third lobe away from the second depression and the fourth tip translocates along the fourth thruster trace and along the second curved surface of the fourth lobe toward the second depression as the fourth coupled member rotates around the second pivot axis in a third rotational direction; and
- when the third actuator is in the third thrusting mode and the fourth actuator is in the fourth relaxing mode, the third tip translocates along the third thruster trace and along the second curved surface of the third lobe toward the second depression and the fourth tip translocates along the fourth thruster trace and along the second curved surface of the fourth lobe away from the second depression as the fourth coupled member rotates around the second pivot axis in a fourth rotational direction that is opposed to the third rotational direction; and wherein
- the second curved surface has a third tangent at each third contact point and has a fourth tangent at each fourth contact point and the third tangent at each third contact point is perpendicular to the third thruster trace and the fourth tangent at each fourth contact point is perpendicular to the fourth thruster trace.

11. The mechanical joint of claim 10 wherein each third contact point has third orthogonal distance from the second pivot axis and each fourth contact point has a fourth orthogonal distance from the second pivot axis and the third orthogonal distance and the fourth orthogonal distance are a value "$r_2$" and the first curved surface conforms at least in part to a loci of $(x_j, y_j)$ points that vary through a varying rotational angle "$\theta_j$" and are defined by: $x_j = r_2*(\cos(\theta_j) + \theta_j*\sin(\theta_j))$, $y_j = r_2*(\sin(\theta_j) - \theta_j*\cos(\theta_j))$.

12. A mechanical joint comprising:
- a first coupled member having a first pivot axis;
- a first cam assembly operatively secured to the first coupled member and having a first lobe disposed on a first side of the first pivot axis and a second lobe disposed on a second side of the first pivot axis opposing the first side, the first lobe and the second lobe defining a first curved surface having a first depression between the first lobe and the second lobe;
- a second coupled member configured to rotate around the first pivot axis through a plurality of first axis angular positions;
- a first actuator operatively secured to the second coupled member and disposed on the first side of first pivot axis and having a first extendible rod with a first tip that is engaged with the first curved surface of the first lobe in a series of first contact points on the first curved surface, each first contact point corresponding to one of the first axis angular positions, and the first actuator having a first thrusting mode and a first relaxing mode and a first thruster trace;
- a second actuator operatively secured to the second coupled member and disposed on the second side of the first pivot axis and having a second extendible rod with a second tip that is engaged with the first curved surface of the second lobe in a series of second contact points on the first curved surface, each second contact point corresponding to one of the first axis angular positions, and the second actuator having a second thrusting mode and a second relaxing mode and a second thruster trace; wherein
- when the first actuator is in the first relaxing mode and the second actuator is in the second thrusting mode, the first tip translocates through a first relaxing relocation distance along the first thruster trace and along the first curved surface of the first lobe away from the first depression and the second tip translocates through a second thrusting relocation distance along the second thruster trace and along the first curved surface of the second lobe toward the first depression as the second coupled member rotates around the first pivot axis in a first rotational direction; and
- when the first actuator is in the first thrusting mode and the second actuator is in the second relaxing mode, the first tip translocates through a first thrusting relocation distance along the first thruster trace and along the first curved surface of the first lobe toward the first depression and the second tip translocates through a second relaxing relocation distance along the second thruster trace and along the first curved surface of the second lobe away from the first depression as the second coupled member rotates around the first pivot axis in a second rotational direction that is opposed to the first rotational direction; and wherein
- the first relaxing relocation distance is substantially equal to the second thrusting relocation distance and the first thrusting relocation distance is substantially equal to the second relaxation relocation distance.

13. The mechanical joint of claim 12 wherein each first contact point has first orthogonal distance from the first pivot axis and each second contact point has a second orthogonal distance from the first pivot axis and the first orthogonal distance and the second orthogonal distance are a value "$r_1$" and the first curved surface conforms at least in part to a loci of $(x_i, y_i)$ points that vary through a varying rotational angle "$\theta_i$" and are defined by: $x_i = r_1*(\cos(\theta_i) + \theta_i*\sin(\theta_i))$, and $y_i = r_1*(\sin(\theta_i) - \theta_i*\cos(\theta_i))$.

14. The mechanical joint of claim 12 wherein the second coupled member has a second pivot axis that is orthogonal to the first pivot axis and the first coupled member is configured to rotate around the second pivot axis through a plurality of second axis angular positions, and
the mechanical joint further comprises:
- a second cam assembly operatively secured to the second coupled member and having a third lobe disposed on a first side of the second pivot axis and a fourth lobe disposed on a second side of the second pivot axis opposing the first side, the third lobe and the fourth lobe defining a second curved surface having a second depression;
- a third actuator operatively secured to the first coupled member and disposed on the first side of second pivot axis and having a third extendible rod with a third tip that is engaged with the second curved surface of the third lobe in a series of third contact points on the second curved surface, each third contact point corresponding to one of the second axis angular positions, and the third actuator having a third thrusting mode and a third relaxing mode and a third thruster trace; and
- a fourth actuator operatively secured to the first coupled member and disposed on the second side of the second pivot axis and having a fourth extendible rod with a fourth tip that is engaged with the second curved surface of the fourth lobe in a series of fourth contact points on the second curved surface, each fourth contact point corresponding to one of the second axis angular positions, and the fourth actuator having a fourth thrusting mode and a fourth relaxing mode and a fourth thruster trace; wherein
when the third actuator is in the third relaxing mode and the fourth actuator is in the fourth thrusting mode, the third tip translocates through a third relaxing relocation distance along the third thruster trace and along the second curved surface of the third lobe away from the second depression and the fourth tip translocates through a fourth thrusting relocation distance along the fourth thruster trace and along the second curved surface of the fourth lobe toward the second depression as the fourth coupled member rotates around the second pivot axis in a third rotational direction; and
when the third actuator is in the third thrusting mode and the fourth actuator is in the fourth relaxing mode, the third tip translocates through a third thrusting relocation distance along the fourth thruster trace and along the second curved surface of the third lobe toward the second depression and the fourth tip translocates through a fourth relaxing relocation distance along the fourth thruster trace and along the second curved surface of the fourth lobe away from the second depression as the fourth coupled member rotates around the second pivot axis in a fourth rotational direction that is opposed to the third rotational direction; and wherein
the third relaxing relocation distance is substantially equal to the fourth thrusting relocation distance and the third thrusting relocation distance is substantially equal to the fourth relaxation relocation distance.

15. The mechanical joint of claim 14 wherein each third contact point has third orthogonal distance from the second pivot axis and each fourth contact point has a fourth orthogonal distance from the second pivot axis and the third orthogonal distance and the fourth orthogonal distance are a value "$r_2$" and the first curved surface conforms at least in part to a loci of $(x_j, y_j)$ points that vary through a varying rotational angle "$\theta_j$" and are defined by: $x_j = r_2 * (\cos(\theta_j) + \theta_j * \sin(\theta_j))$, $y_j = r_2 * (\sin(\theta_j) - \theta_j * \cos(\theta_j))$.

* * * * *